UNITED STATES PATENT OFFICE.

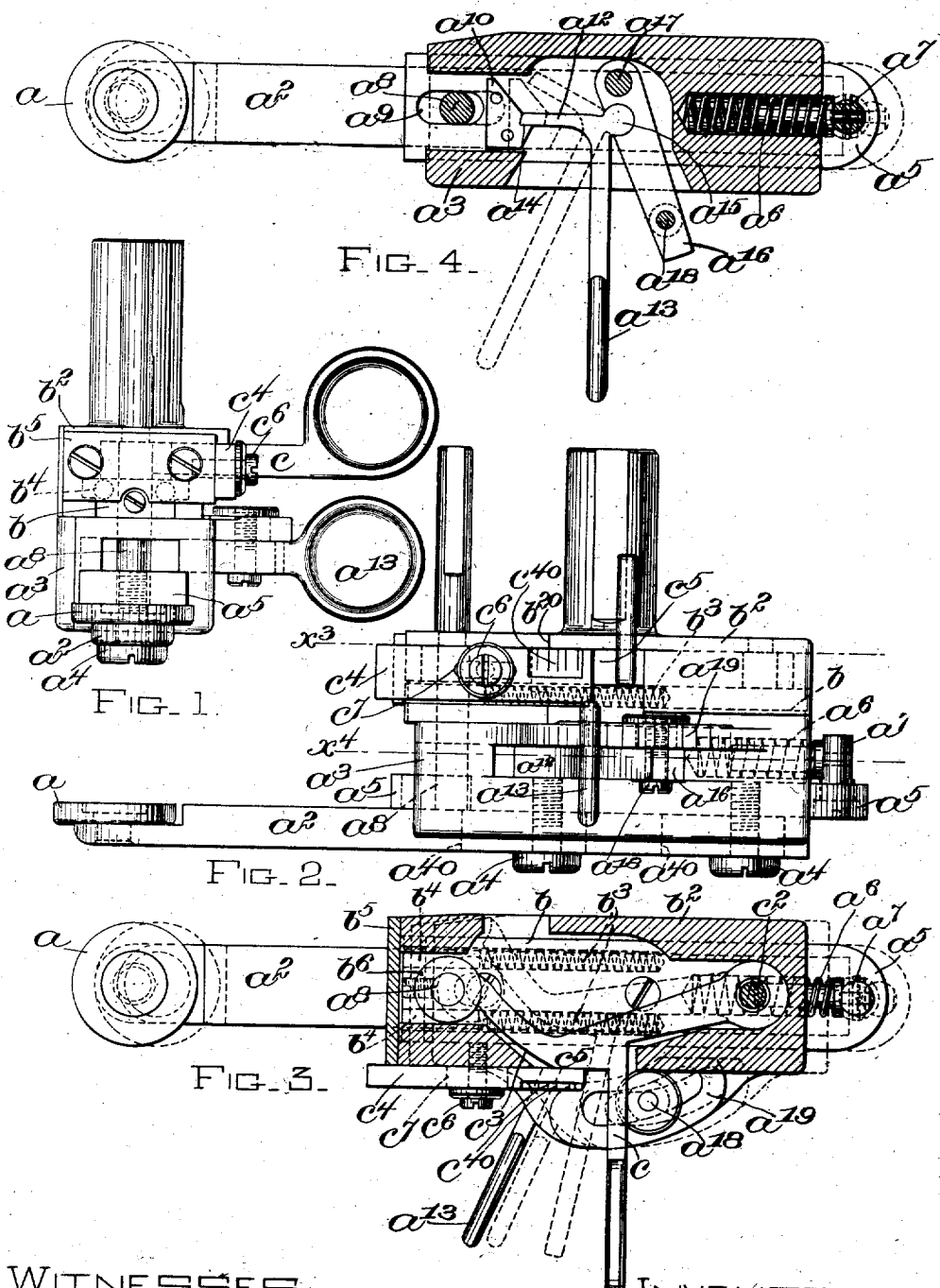

SHERMAN W. LADD, OF BEVERLY, MASSACHUSETTS, ASSIGNOR TO UNITED SHOE MACHINERY COMPANY, OF PATERSON, NEW JERSEY, A CORPORATION OF NEW JERSEY.

GAGE.

976,269.  Specification of Letters Patent.  Patented Nov. 22, 1910.

Application filed June 14, 1900. Serial No. 20,329.

*To all whom it may concern:*

Be it known that I, SHERMAN W. LADD, of Beverly, county of Essex, and State of Massachusetts, have invented an Improvement in Gages, of which the following description, in connection with the accompanying drawings is a specification, like letters on the drawings representing like parts.

The present invention relates to a gage for material which is being operated upon by a machine, the object of the invention being to obtain a gage which may be readily and promptly shifted from one to another of three positions when the machine is intended to operate upon the material successively in three parallel lines.

The gage is mainly intended for use in pegging machines for pegging boots and shoes, to guide the sole of the shoe during the operation of driving the different rows of pegs; although it may obviously be used to advantage in other machines where an edge gage is required to determine the position of the operating devices with relation to the work where the said operating devices are to perform their operations in parallel rows.

It is essential in a gage of this kind that the gage proper should always move uniformly when shifted, and that it should be positively held in the desired position; and the most effectual method of controlling the gage as heretofore constructed is therefore by means of a fixed stop to determine one position, and a movable stop to determine the other position, and a spring to cause the gage to travel toward the fixed stop when the movable stop is manipulated. While two positions may be obtained in this way, it is desirable in some cases that the gage should be moved to a third position, the same positive action being required in this case as before. This is accomplished in accordance with the present invention by bodily mounting a gage provided with mechanism, which may be called the two-way mechanism, for shifting it from one to the other of two positions, upon a stationary part of the machine with relation to which said two-way gage is movable as a whole, and providing the said stationary part with a controlling device whereby the said gage and its two-way mechanism are permitted to be moved to definite positions with relation to said stationary part of the machine.

The two-way gage may be constructed and arranged to operate in any suitable or usual way, and for convenience a two-way gage of substantially the construction shown in the patent to Davey and Ladd No. 581,066 dated April 20, 1897, is herein shown as used in conjunction with and forming a part of the three way gage embodying the present invention. In accordance with the invention, the said two-way gage is so combined with a fixed part of the machine as to be movable with relation thereto, being shown as actuated in such movement by a spring or its equivalent and being controlled by suitable stops having provision for adjustment to vary the amount of throw. The two-way gage mechanism is similarly adjustable, and a further feature of the invention consists in a novel construction and arrangement whereby the several parts may be compactly located and the adjustments effected without interfering with each other.

Figure 1 is a front elevation of a gage embodying the invention; Fig. 2 a side elevation of the same; Fig. 3 a horizontal section on the line $a^3$ of Fig. 2; and Fig. 4 a horizontal section on the line $a^4$ of Fig. 2.

The gage proper $a$ is shown as a wheel adapted to engage the edge of the material to be operated upon, the said wheel being mounted on a shank $a^2$ which is longitudinally movable in a guide frame $a^3$. The said shank is shown as provided with slots $a^{40}$ (dotted lines Fig. 2) through which extend bolts or screws $a^4$ threaded in the under side of a slide $a^5$ the said bolts and slots providing means for initial adjustment with relation to the frame of the machine. The said slide $a^5$ is longitudinally movable in the frame $a^3$ and arranged to be acted upon by a spring $a^6$, shown as having a bearing in a suitable socket at the end of the said frame and arranged to exert its pressure against a stop or projection $a^7$ secured to the slide $a^5$. The movement of the said slide in response to the action of the spring is limited by means of a pin or projection $a^8$ extending downward from the frame $a^3$ and entering a slot $a^9$ in the slide $a^5$, the movement of the said slide being thus limited by the stop which is adapted to engage the wall of the slot $a^9$.

To provide for two positions of the gage, the slide $a^5$ is shown as provided with a cam block $a^{10}$ adapted to coöperate with the end of a lever $a^{12}$ having an operating handle or thumb piece $a^{13}$, the end of the said lever being adapted to ride along the cam surface of the block $a^{10}$, moving the slide $a^5$ against the stress of the spring $a^6$ until the end of the said lever reaches the shoulder $a^{14}$ which is so positioned that the slide and the gage connected therewith will be locked until the thumb piece $a^{13}$ is moved to the left, Fig. 4, which permits the gage and slide to move to the position shown by dotted lines in said figure.

To adjustably control the extent of the forward movement, the fulcrum $a^{15}$ of the lever $a^{12}$ is arranged to be shifted, the said fulcrum being shown as formed in a swinging arm $a^{16}$ pivoted at $a^{17}$ to the frame $a^3$ and having an adjusting screw $a^{18}$ adapted to lock the said arm in any desired position in a retaining device $a^{19}$, shown as an arm provided with a curved slot, said arm being connected with the frame $a^3$. The rearward movement is limited by the stop $a^8$.

The mechanism for controlling the two positions of the gage as thus far described is substantially the same as that shown in the Davey and Ladd patent above referred to, but it is to be understood that any suitable means for controlling the two positions of the gage may be utilized without departing from the present invention, which consists mainly in the combination with such means of devices for obtaining a third position of the gage proper when three lines of work are to be performed on the same material. To accomplish this, the two-way gage above described, or its equivalent, instead of being fixed with relation to the frame of the machine is movable with relation thereto, its frame $a^3$ being mounted on a slide $b$ longitudinally movable in an undercut guide groove in a frame $b^2$ which is adapted to be connected with the framework of the machine so as to be immovable with relation thereto. The said slide $b$ is bored to receive springs $b^3$ and pins $b^4$ against which the said springs bear, the said pins in turn bearing against a plate $b^5$ secured to the end of the frame $b^2$, the tendency of the said springs being to move the slide $b$ rearward with relation to the frame $b^2$. In order to cause such movement to take place when desired, the frame $b^2$ is provided with a controlling lever $c$ pivoted at $c^2$ in the said frame and having an inclined surface $c^3$ which is adapted to coöperate with a roll $b^6$ suitably secured to the slide $b$. As herein shown, said roll is mounted on the pin or projection $a^8$ which extends upward through the slide $b$. The normal position of the said lever $c$ is determined by a plate $c^4$ secured to the side of the frame $b^2$ and adapted to be engaged by a part $c^5$ of the lever $c$ which part is so shaped that the end of the lever will, when the lever is in said normal position, engage the roll $b^6$ at a point in line with the springs $b^3$, thus holding the slide $b$ in a definite position with relation to the frame of the machine, which position is not variable by adjustment. Upon shifting the said lever, the extent of rearward movement of the slide is controlled by the engagement of the roll $b^6$ with the inclined surface $c^3$ of the lever, it being obvious that the greater the movement of the lever from its normal position the greater will be the movement of the slide $b$. To adjust the throw of the slide, therefore, the handle portion of the lever $c$ is adapted to bring up against the end of the plate $c^4$ (see dotted lines, Fig. 3) which is secured by a screw $c^6$ extending into the frame $b^2$ through a slot $c^7$, so that by loosening the said screw the plate can be longitudinally adjusted and then locked. The position of said plate, therefore, determines the extent of movement of the lever, as shown in Fig. 3, where the normal and abnormal positions of the lever are shown in full and dotted lines respectively, varying the point of engagement of the roll $b^6$ with the inclined surface $c^3$, and thereby also varying the extent of movement of the slide $b$ from its normal position. For convenience the frame $b^2$ is provided with a mark $b^{20}$ and the plate $c^4$ is provided with marks $c^{40}$ so that the various positions can be easily determined by moving the plate until the mark $b^{20}$ and any one of the marks $c^{40}$ are in alinement with each other. It will be seen that by this arrangement the adjusting device for the two-way gage and the adjusting device which controls the third position of the gage do not in any way interfere with each other, and are both readily accessible so that the adjustment can be made without trouble.

A further advantage of the arrangement is that both adjustments are made with relation to a definite non-variable intermediate position which is always the same with relation to the machine. This position is determined by the lever $c$ which has a pivotal support fixed with relation to the working parts of the machine, and which is so arranged that when it is in its normal position (full lines Fig. 3) the roll $b^6$ upon the gage slide $b$ will be at a definite distance from the point where the lever is pivoted the said gage slide thus having one position which cannot be varied by adjustment. The forward position of the limiting stop $a^8$ for the gage slide $a^5$, which is connected with the slide $b$, is thus definitely fixed with relation to the frame of the machine, this stop when in said forward position determining the intermediate position of the gage slide, the adjustment of one controlling device varying the movement of the gage slide from said stop in one direction while the adjustment of the other controlling device varies the movement of the gage slide from the position normally determined by said stop, the stop traveling with the gage in the other direction. In other words, when the gage proper $a$ is in position shown in Fig. 4, the manipulation of the handle $a^{13}$ permits the said gage to travel back to the dotted line position where it is arrested by the stop $a^8$, this being the intermediate gaging position which is always the same relative to the machine for the reason that the position of the stop $a^8$ is controlled by the lever $c$ which is pivoted to the stationary part of the frame of the machine. The gage may then be moved to its third position by manipulating the lever $c$, which permits the slide $b^2$ to which the stop $a^8$ is connected to move back, the slide, stop and gage traveling together to the position determined by the final position of the lever $c$ which position is variable as previously described. The adjustments are therefore entirely independent of each other, while the initial adjustment provided for by the slots $a^{10}$ in the shank $a^2$ can be made from an intermediate position of the gage slide which is always the same with relation to the operative parts of the machine.

In the operation of the device for setting three rows of pegs the gage is originally set as shown in Figs. 1 and 2, and in full lines Fig. 4, its position being the nearest of all to the work support so as to control the position of the outer row of pegs or stitches or the like. When in this position the springs are all compressed ready to act, so that when the gage is to be shifted to its second or intermediate position, the movement of the lever $a^{12}$ causes the said gage to snap into place where it is positively held by the stop $a^8$, that is, into the intermediate position from which the adjustments are made. Similarly, when the gage is to be shifted to its third position, the movement of the lever $c$ permits the slide $b$ and the gage carried thereby to snap into the position controlled by the said lever $c$, there being no possibility in any of the said movements, of mistake on the part of the operator. The device, therefore, is more readily and accurately operated than would be possible if the gage were provided with a single controlling device arranged to be successively set in different positions, in which instance it would be necessary for the operator to exercise care and judgment each time he moved the gage.

It is to be understood that the invention is not limited to the specific construction and arrangement of instrumentalities in which it is shown as embodied, the invention consisting mainly in the combination with a two-way gage, of a controlling device for determining the position of said gage as a whole, a third position for the gage proper thus being obtainable.

Claims.

1. In a gage for a machine, a frame movable with relation to the machine; a gage slide movable in said frame from one operative position to another; a controlling device whereby said gage slide may be moved with relation to said movable frame from one to the other of said operative positions; and means for shifting the said movable frame and the gage slide carried thereby from one to the other of two positions relative to the machine, substantially as described.

2. A movable frame and a gage longitudinally movable therein; a controlling device whereby the said gage may be shifted with relation to said movable frame from one to the other of two operative positions; and a stationary frame for the said movable frame provided with means for shifting the said movable frame and the gage carried thereby from one to the other of two operative positions relative to said stationary frame.

3. The combination with a movable frame; of a two-way gage mounted therein; a stationary frame for said movable frame; a stop connected with said movable frame; a lever supported on said stationary frame and adapted to engage said stop, the position of said lever determining the position of the movable frame; and an adjustable stop to determine the position of said lever.

4. The combination with a stop; of a two-way gage spring pressed toward said stop; an adjustable controlling device for moving said gage away from said stop; and means for causing a movement of said stop to provide for a third position of the gage, as set forth.

5. The combination with a stop; of a two-way gage spring pressed toward said stop; an adjustable controlling device for moving said gage away from said stop; a retaining device for normally retaining said stop in a definite position with relation to the machine but adapted to permit a movement thereof away from such position; and means for adjusting said retaining device to vary the extent of such movement of said stop.

6. A three-way gage having a releasable gage-carrying slide movable toward and from a work support, a movable stop, means to automatically move the slide when released to a non-variable intermediate position and means to move the slide and stop to cause the gage to assume a third position.

7. A three-way gage having a releasable gage-carrying slide movable toward and from a work support, a stop, means to automatically move the slide to a non-variable intermediate position controlled by said stop, said slide being capable of movement in either direction from said position when released, and means for varying the extent of such movement in either direction.

8. A three-way gage having a releasable gage-carrying slide movable toward and from a work support, means including a movable stop arranged to automatically arrest the slide in a non-variable intermediate position when it is released and permitted to move away from the work support, and means to move the slide and stop to cause the gage to assume a third position.

9. A gage mechanism comprising a releasable gage-carrying slide, a stop, means to automatically move the slide when released to a non-variable intermediate position controlled by said stop, means whereby said slide may be moved in either direction from said position, and independently adjustable devices for varying the distance through which said slide may be moved in either direction.

In testimony whereof, I have signed my name to this specification in the presence of two subscribing witnesses.

SHERMAN W. LADD.

Witnesses:
  HENRY J. LIVERMORE,
  NANCY P. FORD.